United States Patent
Vollmer

(10) Patent No.: US 9,954,404 B2
(45) Date of Patent: Apr. 24, 2018

(54) PERMANENTLY MAGNETICALLY EXCITED ELECTRIC MACHINE

(71) Applicant: SIEMENS AKTIENGESELLSCHAFT, München (DE)

(72) Inventor: Rolf Vollmer, Gersfeld (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 302 days.

(21) Appl. No.: 14/969,815

(22) Filed: Dec. 15, 2015

(65) Prior Publication Data

US 2016/0172915 A1 Jun. 16, 2016

(30) Foreign Application Priority Data

Dec. 16, 2014 (EP) .................... 14198232

(51) Int. Cl.
*H02K 1/27* (2006.01)

(52) U.S. Cl.
CPC .................... *H02K 1/278* (2013.01)

(58) Field of Classification Search
CPC .......... H02K 1/16; H02K 1/27; H02K 1/2706; H02K 1/276; H02K 1/2766; H02K 1/278; H02K 21/12; H02K 21/14; H02K 21/16; H02K 29/03
See application file for complete search history.

(56) References Cited

U.S. PATENT DOCUMENTS

| | | | |
|---|---|---|---|
| 4,713,569 A | 12/1987 | Schwartz | |
| 6,242,837 B1 * | 6/2001 | Matsunobu | H02K 1/276 310/216.001 |
| 6,483,221 B1 | 11/2002 | Pawellek et al. | |
| 6,628,031 B2 | 9/2003 | Vollmer | |
| 6,768,238 B2 | 7/2004 | Knauff et al. | |
| 6,812,612 B2 | 11/2004 | Schunk et al. | |
| 6,858,965 B2 | 2/2005 | Mueller et al. | |
| 6,885,187 B2 | 4/2005 | Duenisch et al. | |
| 6,943,467 B2 | 9/2005 | Potoradi et al. | |
| 7,109,624 B2 * | 9/2006 | Yashiro | H02K 1/276 310/156.45 |
| 7,141,905 B2 | 11/2006 | Vollmer | |
| 7,285,883 B2 | 10/2007 | Bott et al. | |
| 7,564,158 B2 | 7/2009 | Huth et al. | |
| 7,705,507 B2 | 4/2010 | Vollmer | |

(Continued)

FOREIGN PATENT DOCUMENTS

| | | |
|---|---|---|
| DE | 103 48 401 A1 | 5/2004 |
| DE | 103 03 848 A1 | 8/2004 |

(Continued)

*Primary Examiner* — Tran Nguyen
(74) *Attorney, Agent, or Firm* — Henry M. Feiereisen LLC

(57) ABSTRACT

An electric machine includes a stator having 48 grooves and 48 tooth coils, and a rotor interacting with the stator. The rotor has eight magnetic poles along an external circumference of the rotor in an annular arrangement, with adjacent magnetic poles defining angular distances defined successively at 41.25°, 39.75°, 41.25°, 57.75°, 41.25°, 39.75°, 41.25° and 57.75°. The angular distances have a tolerance range of 0.4°. The electric machine has a pole arc between 0.6 and 0.7.

4 Claims, 2 Drawing Sheets

(56) References Cited

U.S. PATENT DOCUMENTS

| | | |
|---|---|---|
| 7,709,984 B2 | 5/2010 | Braun et al. |
| 7,732,967 B2 | 6/2010 | Vollmer et al. |
| 7,755,315 B2 | 7/2010 | Bott et al. |
| 7,777,373 B2 | 8/2010 | Bott et al. |
| 7,859,160 B2 | 12/2010 | Vollmer |
| 7,915,777 B2 | 3/2011 | Vollmer |
| 7,977,826 B2 | 7/2011 | Vollmer et al. |
| 8,026,640 B2 | 9/2011 | Bott et al. |
| 8,063,517 B2 | 11/2011 | Bott et al. |
| 8,115,360 B2 | 2/2012 | Vollmer |
| 8,134,273 B2 | 3/2012 | Vollmer et al. |
| 8,227,951 B2 | 7/2012 | Grossmann et al. |
| 8,283,815 B2 | 10/2012 | Vollmer |
| 8,378,541 B2 | 2/2013 | Vollmer |
| 8,441,158 B2 | 5/2013 | Vollmer |
| 8,674,560 B2 | 3/2014 | Budde et al. |
| 8,853,894 B2 | 10/2014 | Fick et al. |
| 8,922,072 B2 | 12/2014 | Bott et al. |
| 9,160,206 B2 | 10/2015 | Potoradi et al. |
| 2006/0219880 A1 | 10/2006 | Braun et al. |
| 2007/0040466 A1 | 2/2007 | Vollmer |
| 2007/0114861 A1 | 5/2007 | Bott et al. |
| 2007/0257566 A1 | 11/2007 | Vollmer |
| 2007/0257575 A1 | 11/2007 | Vollmer |
| 2008/0169718 A1 | 7/2008 | Schunk et al. |
| 2008/0185931 A1 | 8/2008 | Platen et al. |
| 2008/0289440 A1 | 11/2008 | Vollmer et al. |
| 2008/0315704 A1 | 12/2008 | Vollmer |
| 2009/0009114 A1 | 1/2009 | Schunk et al. |
| 2009/0015080 A1 | 1/2009 | Vollmer et al. |
| 2009/0152959 A1 | 6/2009 | Vollmer |
| 2009/0160283 A1 | 6/2009 | Vollmer et al. |
| 2009/0184602 A1 | 7/2009 | Braun et al. |
| 2009/0251013 A1 | 10/2009 | Vollmer et al. |
| 2009/0261679 A1* | 10/2009 | Sakai .............. H02K 1/276 310/156.53 |
| 2009/0302832 A1 | 12/2009 | Budde et al. |
| 2009/0315424 A1 | 12/2009 | Vollmer |
| 2010/0000830 A1 | 1/2010 | Budde et al. |
| 2010/0013333 A1 | 1/2010 | Vollmer |
| 2010/0133940 A1 | 6/2010 | Grossmann et al. |
| 2010/0264770 A1 | 10/2010 | Braun et al. |
| 2012/0025654 A1 | 2/2012 | Bach et al. |
| 2013/0127264 A1 | 5/2013 | Fick et al. |
| 2013/0147285 A1 | 6/2013 | Vollmer et al. |
| 2013/0193783 A1* | 8/2013 | Aoyama ............ H02K 21/14 310/51 |
| 2013/0241324 A1 | 9/2013 | Mader et al. |
| 2013/0241335 A1 | 9/2013 | Vollmer et al. |
| 2014/0042857 A1 | 2/2014 | Mader et al. |
| 2014/0070655 A1 | 3/2014 | Schneider et al. |
| 2014/0097782 A1 | 4/2014 | Vollmer |

FOREIGN PATENT DOCUMENTS

| | | |
|---|---|---|
| EP | 2 073 352 A1 | 6/2009 |
| WO | WO 2004-070921 A1 | 8/2004 |

* cited by examiner

US 9,954,404 B2

PERMANENTLY MAGNETICALLY EXCITED ELECTRIC MACHINE

CROSS-REFERENCES TO RELATED APPLICATIONS

This application claims the priority of European Patent Application, Serial No. 14198232.2, filed Dec. 16, 2014, pursuant to 35 U.S.C. 119(a)-(d), the disclosure of which is incorporated herein by reference in its entirety as if fully set forth herein.

BACKGROUND OF THE INVENTION

The present invention relates to an electric machine.

The following discussion of related art is provided to assist the reader in understanding the advantages of the invention, and is not to be construed as an admission that this related art is prior art to this invention.

Permanently magnetically excited electric machines are increasingly of interest because of their very reliability and operation with a high degree of efficiency. The permanently excited electric machines can be operated as a motor or as a generator. The permanently magnetically excited electric machine can be used for example as a servomotor. Servomotors have a large number of fields of application. They are often used in industrial facilities. They may also be used in diverse machines, for example in machine tools, packaging machines or industrial robots.

FIG. 2 shows by way of example a conventional rotor design by way of which the disruptive effects are to be kept low. As is apparent from FIG. 2, the rotor design includes a rotor 16 with graduated magnetic poles 18. In the circumferential direction adjacent magnetic poles 18 have the same distance or the same angular position relative to one another per graduated disk. In the case of an 8-pole rotor the magnets have an angular distance of 45°.

It would be desirable and advantageous to provide an improved electric machine to obviate prior art shortcomings and to keep torque ripple particularly low.

SUMMARY OF THE INVENTION

According to one aspect of the present invention, an electric machine includes a stator having 48 grooves and 48 tooth coils, and a rotor interacting with the stator, said rotor having eight magnetic poles along an external circumference of the rotor in an annular arrangement, with adjacent magnetic poles defining angular distances defined successively at 41.25°, 39.75°, 41.25°, 57.75°, 41.25°, 39.75°, 41.25° and 57.75°, with the angular distances having a tolerance range of 0.4°, wherein the electric machine has a pole arc between 0.6 and 0.7.

In accordance with the present invention, the magnetic poles are arranged on the circumference of the rotor with different relative position angles. The effect of different position angles or angular distances is such that the distances, i.e. the lengths of an arc of a circle, between two magnetic poles respectively that are adjacent in the circumferential direction are different so long as the values of the angular distances are not identical. The magnets can be arranged for example in an annular arrangement such that their center point is intersected by a hypothetical straight line which, starting from a center point of the rotor, extends to the magnetic center point, wherein a further hypothetical straight line, which likewise runs through the center point of a further adjacent magnet, also starting from the rotor center point, extends to this straight line at a respective angular distance.

To ensure clarity, it is necessary to establish the definition of several important terms and expressions that will be used throughout this disclosure.

The term "magnetic poles" relates to permanent magnets, it being possible for the magnetic poles to have different polarities.

The term "angular distance" relates to a distance between two straight lines, wherein, starting from the center point of the rotor (rotor axis), the straight lines extend radially outwards to the center point of the magnetic poles. The angular distance is measured in degrees, such as e.g. 45°.

The term "tolerance range" relates to a positive or negative value of a deviation from the respective value of the angular distance between the respectively adjacent magnetic poles. The sum of all eight values for the angular distances between the magnetic poles is 360°, however. The appropriate arrangement of the magnetic poles on the circumference of the rotor results in the advantage that disruptive effects, such as for example varying torques, are reduced.

The rotor is arranged in the stator having 48 grooves and 48 tooth coils. In other words, a stator having 48 grooves and 48 tooth coils is associated to the rotor. The electric machine can have a pole arc between 0.6 and 0.7.

The term "pole arc" relates to a ratio of the angle of projection of the magnet onto the stator bore to the pole angle. In other words, the pole arc results from the ratio of the magnetic angle to the pole angle. The magnetic angle can be determined in that, starting from two magnetic edges, i.e. a first and a second edge of a magnet, wherein the second edge opposes the first edge in the circumferential direction, the line of the magnetic edge is hypothetically lengthened in the direction of the inner diameter of the stator bore, so one point of intersection respectively with the inner circle of the stator bore results for one lengthened magnetic edge line respectively of the same magnet and, starting from the rotor center point, two straight lines are guided to the points of intersection.

The magnetic angle corresponds to the angle between these two straight lines. The horizontal distance between the magnetic edges or the first and second edges of the magnet represents the magnet width. The pole angle can be calculated with the aid of the formula pole angle=$a_p$=$360°/(2*p)$ The pole angle is given in degrees, like the magnetic angle. In the denominator of the above-described formula the variable p represents the number of pole pairs or the pole pair number which is multiplied by 2. For example, in an 8-pole electric machine, the pole pair number corresponds to the value 4. Therefore a pole angle $a_p$ of 45° results for example for an 8-pole electric machine.

According to another advantageous feature of the present invention, the magnetic poles can be formed as segment magnets. Segment magnets are characterized in that their bottom side, i.e. the face which rests on the laminated core of the rotor, and the top side, i.e. the face that opposes the bottom side, are curved in such a way that their curvatures match the curvature of the circle with the same radial distance from the axis of rotation in each case. This has the advantage that a narrow and uniform air gap can be enabled between magnetic pole surface and stator inner face or pole face, while nevertheless ensuring a firm fit on the laminated core.

According to another advantageous feature of the present invention, flow barriers can extend axially from a first axial end of the rotor to an opposing second axial end of the rotor, said flow barriers being arranged radially inwardly and centrally at a predefined distance from the magnetic poles.

The term "inwardly" relates to the flow barriers being arranged under the magnetic poles, as viewed in the direction of the rotor center point.

The term "flow barriers" relates to cavities which can have for example a cylindrical form. This has the advantage that the rotor is lighter and therefore has a particularly low weight. Furthermore, the presence of the flow barriers means that no magnetic short circuits occur. Both of these factors mean that particularly low losses occur during operation of the electric machine.

According to another advantageous feature of the present invention, at least one further annular arrangement can be provided and include eight magnetic poles, wherein the magnetic poles of the annular arrangements are arranged in axial alignment.

The term "axially aligned" relates to an arrangement of the magnetic poles along a line parallel to the axis of rotation. The magnetic poles can be provided in a straight line on the rotor due to this avoidance of graduating or slanting measures of magnetic poles on the rotor. This has the advantage that magnetization on the rotor is possible with straight magnetization yokes. This simplifies the production engineering and the number of means of production.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
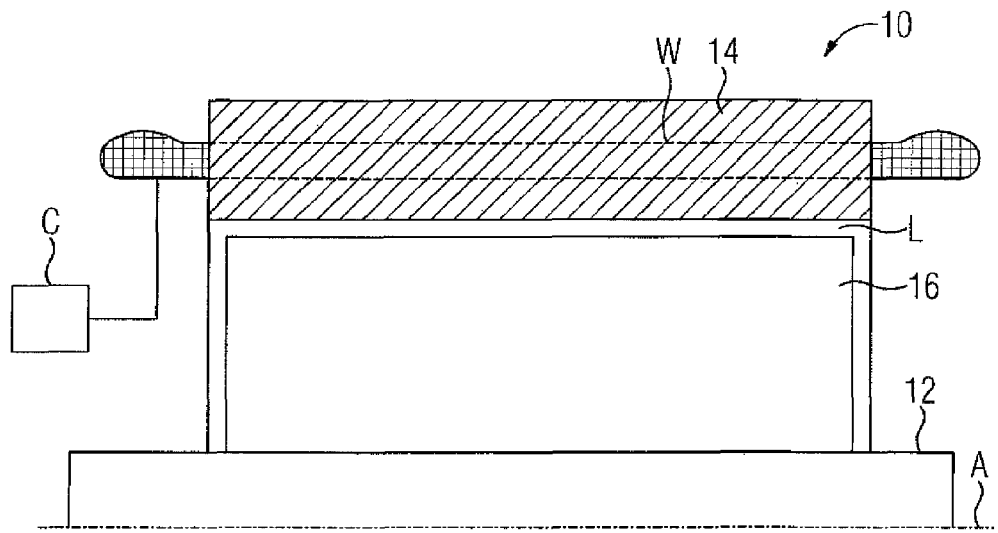
FIG. 1 shows a schematic illustration of a cross-section of one embodiment of an electric machine according to the present invention.
Figure 2:
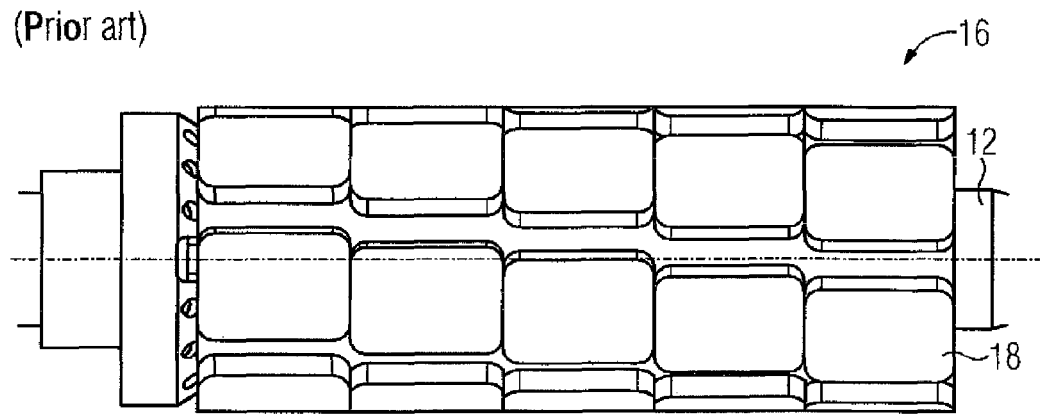
FIG. 2 shows a schematic illustration of a conventional rotor having graduated magnets.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

The exemplary embodiments described below are preferred embodiments of the invention. However, in the exemplary embodiments the described components of the embodiment each represent individual features of the invention which should be considered independently of each other and which also each develop the invention independently of each other and therefore may also be regarded individually, or in one of the illustrated combinations, as a component of the invention. Furthermore, the described embodiments may also be supplemented by further features of the invention that have already been described.

Turning now to the drawing, and in particular to FIG. 1, there is shown a general design of an electric machine. In FIG. 1, an axis of rotation A also represents an axis of symmetry in the diagram. The electric machine 10 includes a stator 14 in which windings W of electric coils are arranged, with only one of the windings W being shown in FIG. 1. The windings W are alternately supplied by a three-phase current source C, so that a magnetic rotating field is produced in an air gap L of the electric machine 10 inside the stator 14. The three-phase current source C can be, for example, an inverter or a fixed-frequency electric supply grid.

Inside the stator 14, there is a rotor 16 which is connected in fixed rotative engagement to a shaft 12. The shaft 12 is rotatable about the axis of rotation A and mounted in the stator 14.

Figure 3:
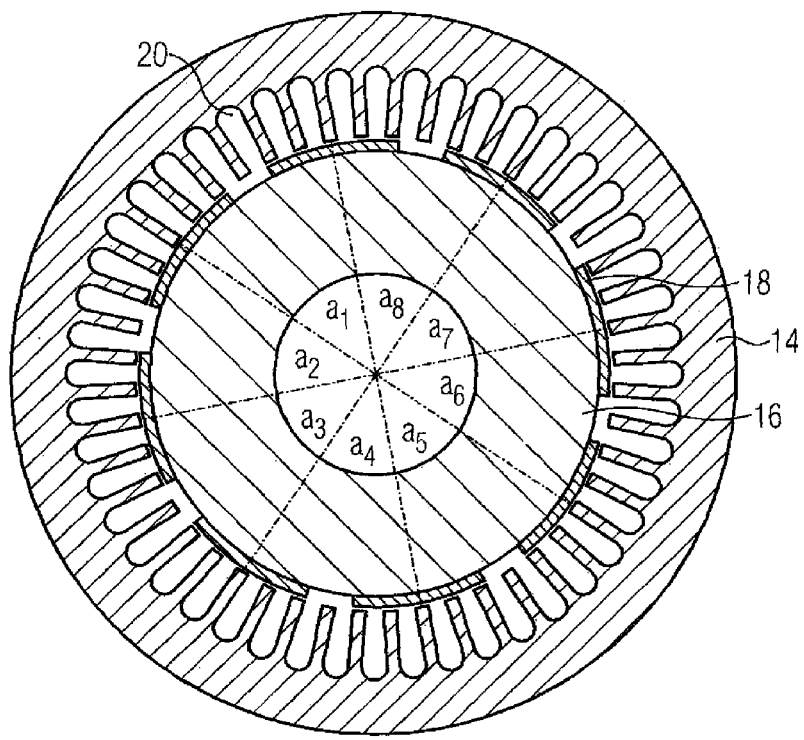
FIG. 3 shows a schematic sectional view of a cross-section of the electric machine of FIG. 1 with a rotor according to the present invention.

FIG. 3 shows a detail of an electric machine 10 and a stator 14 and a rotor 16. The electric machine 10 can be, for example, a motor, such as for example a PM servomotor (PM-permanent magnet), or a generator. The rotor 16 has eight magnetic poles 18 provided along its external circumference in an annular arrangement.

Between respectively adjacent magnetic poles 18, there are angular distances a1 to a8, wherein the angular distances are successively 41.25°, 39.75°, 41.25°, 57.75°, 41.25°, 39.75°, 41.25° and 57.75°. The respective angular distances a1 to a8 can have a tolerance range 0.4°. Still, the sum of all angular distances is always 360°. The rotor 16 has a hole number of 2. The magnetic poles 18 are alternately north and south poles. The stator 14 having 48 grooves 20 and 48 tooth coils is allocated to the rotor 16.

Figure 4:
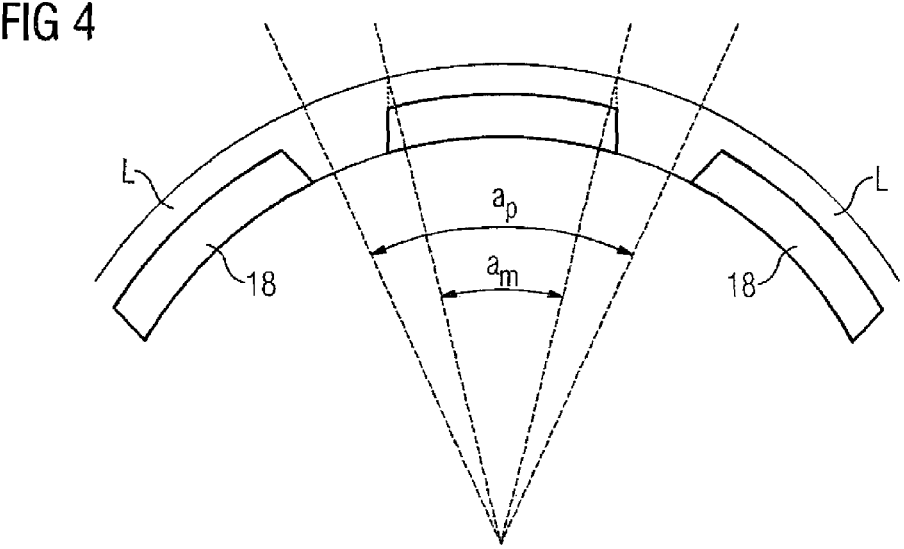
FIG. 4 shows a detail of FIG. 3.

FIG. 4 shows a schematic view of a detail of the inventive rotor 16. Magnetic poles 18 are arranged on the circumference of the rotor 16. An air gap L is formed between the rotor 16 and the stator 14. As may be seen in FIG. 4, two angles, namely the magnetic angle $a_m$ and pole angle $a_p$, are shown. The pole angle $a_p$ can be calculated by the formula: 360°/(2*p), wherein in the denominator the variable p corresponds to the number of pole pairs. The magnet width results from the calculation of the horizontal distance between the first and the second magnetic edges, and this is arranged in the circumferential direction of the rotor with respect to the first edge. In the present exemplary embodiment, one magnetic pole 18 has three magnets. The electric machine 10 has a pole arc between 0.6 and 0.7. The pole arc results from the ratio of magnetic angle $a_m$ to pole angle $a_p$ (pole arc=$a_m/a_p$).

Overall a permanently magnetically excited machine having rotated magnetic poles is realized. This relates to a 3-phase, 8-pole and 48-groove electric machine having non-slanted stator, permanent magnetic excitation and simple rotor design. The torque ripple is therefore kept low by simple measures, so manufacturing costs are low.

The exemplary embodiment shows a combination of different position angles of the magnetic poles on the circumference of the motor with an associated pole arc (magnet width/pole pitch). By avoiding graduating and slanting measures on the motor, the magnets can be provided in a straight line on the rotor. Magnetization on the rotor is therefore possible with straight magnetization yokes. This simplifies production engineering and the number of means of production. The combination of partial pole arc and position angles produces the most pronounced technical effect. The position angles are produced by rotation of individual poles.

Due to the reduced torque ripple and the simple design of the rotor, electric machines having a rotor of this kind are primarily used in vehicle drives and industrial facilities and systems. The electric vehicle drives involve rail-bound vehicles, such as trams, trainsets, locomotives as well as electric cars, mining trucks and similarly applications in electric aircraft. In industrial facilities and systems, the reduced torque ripple and the simple design is primarily provided for machine tools and tool machining, as is the application of electric machines of this kind in industrial robots, packaging machines or logistics centers. There, the electric machine is primarily used as a servomotor which is particularly suitable due to its control of the angular position of the shaft of the electric machine and of the rotational speed and acceleration.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. An electric machine, comprising:
   a stator having 48 grooves and 48 tooth coils; and
   a rotor interacting with the stator, said rotor having eight magnetic poles along an external circumference of the rotor in an annular arrangement, with adjacent magnetic poles defining angular distances defined successively at 41.25°, 39.75°, 41.25°, 57.75°, 41.25°, 39.75°, 41.25° and 57.75° said angular distances having a tolerance range of 0.4°,
   said electric machine having a pole arc between 0.6 and 0.7.

2. The electric machine of claim 1, wherein the magnetic poles are formed as segment magnets.

3. The electric machine of claim 1, further comprising flow barriers extending axially from a first axial end of the rotor to an opposing second axial end of the rotor, said flow barriers being arranged radially inwardly and centrally at a predefined distance from the magnetic poles.

4. The electric machine of claim 1, further comprising at least one further annular arrangement comprising eight magnetic poles, wherein the magnetic poles of the annular arrangements are arranged in axial alignment.

* * * * *